(12) United States Patent
Levkovitch et al.

(10) Patent No.: US 12,556,381 B2
(45) Date of Patent: Feb. 17, 2026

(54) OUT-OF-BAND QUANTUM KEY DISTRIBUTION USING CELLULAR SMS

(71) Applicants: Interwise Ltd., Airport City (IL); AT&T Intellectual Property I, L.P., Atlanta, GA (US)

(72) Inventors: Tomer Levkovitch, Tel Aviv (IL); Ido Shargil, Shoham (IL); Lior Horn, Yokneam Illit (IL); Mark Rasin, Mazkeret Batya (IL); David Bachar, Hod-Hasharon (IL); David Khanin, Ashdod (IL); William R. Trost, Mequon, WI (US)

(73) Assignees: Interwise Ltd., Airport City (IL); AT&T Intellectual Property I, L.P., Atlanta, GA (US)

( * ) Notice: Subject to any disclaimer, the term of this patent is extended or adjusted under 35 U.S.C. 154(b) by 41 days.

(21) Appl. No.: 18/770,060

(22) Filed: Jul. 11, 2024

(65) Prior Publication Data
US 2026/0019241 A1   Jan. 15, 2026

(51) Int. Cl.
| | | |
|---|---|---|
| H04L 9/08 | (2006.01) | |
| H04W 4/14 | (2009.01) | |
| H04W 12/041 | (2021.01) | |
| H04W 12/0431 | (2021.01) | |

(52) U.S. Cl.
CPC .......... *H04L 9/0852* (2013.01); *H04L 9/0838* (2013.01); *H04W 4/14* (2013.01); *H04W 12/041* (2021.01); *H04W 12/0431* (2021.01); *H04L 2209/80* (2013.01)

(58) Field of Classification Search
CPC . H04L 9/0852; H04L 9/0838; H04L 2209/80; H04W 12/0431; H04W 12/041; H04W 4/14
See application file for complete search history.

(56) References Cited

U.S. PATENT DOCUMENTS

| | | | | |
|---|---|---|---|---|
| 9,654,287 | B2 * | 5/2017 | Zhao | ............... H04L 9/083 |
| 10,560,265 | B2 * | 2/2020 | Zhao | ............. H04L 63/083 |
| 11,563,725 | B2 * | 1/2023 | Wane | .............. H04L 51/08 |
| 12,120,098 | B2 * | 10/2024 | Wane | ............. H04L 9/0861 |
| 12,170,729 | B2 * | 12/2024 | Jeong | ............ H04L 9/0827 |
| 2016/0127127 | A1 * | 5/2016 | Zhao | ............ H04W 12/041 |
| | | | | 713/171 |
| 2017/0214525 | A1 * | 7/2017 | Zhao | .......... H04W 12/0431 |
| 2019/0149327 | A1 * | 5/2019 | Yuan | ............. H04L 9/0852 |
| | | | | 380/255 |

(Continued)

*Primary Examiner* — Sharon S Lynch
(74) *Attorney, Agent, or Firm* — Hartman & Citrin LLC

(57) ABSTRACT

Out-of-band quantum key distribution using cellular SMS can include receiving, from a user device, a client identifier that identifies the user device and a first key identifier that identifies a first key having a first key value that is a first quantumly generated random bit string. A second key that includes a second key value can be requested and received from the key service, the second key value including a second quantumly generated random bit string. The second key value can be provided to a short message service center for delivery to the user device. An operation can be performed on the first key value and the second key value to obtain a copy of a pre-shared key, which can be used when exchanging encrypted communications with the user device.

20 Claims, 8 Drawing Sheets

(56) References Cited

U.S. PATENT DOCUMENTS

| | | | | |
|---|---|---|---|---|
| 2021/0352055 A1* | 11/2021 | Wane | ................. | H04L 63/0435 |
| 2022/0353071 A1* | 11/2022 | Jeong | ................... | H04L 9/0852 |
| 2023/0164126 A1* | 5/2023 | Wane | ................... | H04L 9/0869 |
| | | | | 713/152 |
| 2025/0039158 A1* | 1/2025 | Wane | ................... | H04L 63/062 |

* cited by examiner

OUT-OF-BAND QUANTUM KEY DISTRIBUTION USING CELLULAR SMS

BACKGROUND

Some methods of key distribution may be susceptible to interception. Similarly, possession of some keys may create vulnerabilities in security technologies. For example, quantum computing may pose a threat to some public key encryption systems by their ability to potentially break encryption algorithms. Furthermore, distribution of quantum keys can be difficult to deploy ubiquitously.

Quantum Key Distribution (QKD) may solve some challenges, but QKD systems may require dedicated point-to-point connections and/or specialized hardware, which may limit their scalability and/or accessibility. Symmetric key distribution solves some of these challenges, but may introduce new vulnerabilities as key components could be harvested and reconstructed by malicious users.

SUMMARY

The present disclosure is directed to out-of-band quantum key distribution using cellular short message service ("SMS") messages. A user device can execute a key application to request key components and to generate a key for use in encrypted communications (e.g., a pre-shared key that is not shared between devices and instead is generated by the devices involved in the encrypted communications). The user device can communicate with a key service to request creation of a first key, first key portion, or first key component ("key1"). The key service can generate the value of the first key ("key1 value") by using and/or by accessing a quantum random number generator that can quantumly generate a random bit string as the key1 value. The key service can be configured to create and/or associate a first key identifier ("key1 ID") with the key1 value, and to provide the key1 value to the user device. It can be appreciated that the key1 ID and the key1 value can be included as part of the key data exchanged between the user device and the key gateway or the server computer or other device that can host the key service. The key service also can be configured to store the key1 value with the key1 ID as part of the key and client data or other data structure, which can be stored at the server computer and/or at a data storage location or device that can be accessible to the server computer in some embodiments. It should be understood that this example embodiment is illustrative, and therefore should not be construed as being limiting in any way.

The user device can be configured (e.g., via execution of the key application) to communicate with a key gateway to trigger creation of a second key, second key portion, or second key component ("key2"). In particular, the user device can send, to the key gateway, the key1 ID and a client identifier ("clientID") such as a device identifier, a subscriber identifier, or the like. The key gateway can be configured to request the key1 value from the key service in response to receiving the key1 ID and the clientID from the user device. In requesting the key1 value from the key service, the key gateway can reference the clientID, which can be used by the key service to lookup the key1 value (e.g., in the key and client data), and the key service can provide the key1 value to the key gateway. It can be appreciated that the key1 ID and the clientID can be included as part of the key data exchanged between the user device and the key gateway and between the key gateway and the server computer or other device that can host the key service. It should be understood that this example embodiment is illustrative, and therefore should not be construed as being limiting in any way.

The key gateway also can be configured to request a second key, second key portion, or second key component ("key2") from the key service in response to receiving the key1 ID and the key1 value from the key service. It can be appreciated that the request for the second key ("key2 request") can be included as part of the key data exchanged between the key gateway and the server computer or other device that can host the key service. In response to receiving the key2 request, the key service can generate the key2 value by using and/or by accessing the quantum random number generator. Again, the quantum random number generator can be configured to quantumly generate a second random bit string as the key2 value. The key service can be configured to create and/or associate a second key identifier ("key2 ID") with the key2 value, and to provide the key2 value to the key gateway. It should be noted that the key service can be configured not to directly provide the key2 value to the user device in various embodiments. It should be understood that this example embodiment is illustrative, and therefore should not be construed as being limiting in any way.

The key gateway can be configured to receive the key2 ID and the key2 value from the key service. Thus, it can be appreciated that the key gateway can be in possession of the key1 value and the key2 value. Furthermore, in response to receiving the key2 ID and key2 value, the key gateway can be configured to send the key2 value to a short message service center ("SMSC") of a mobility network with instructions to send the key2 value to the user device. Thus, it can be appreciated that the key gateway can be configured to send the key2 value to the SMSC with the clientID and/or other data that can identify the user device (e.g., a phone number or the like). The SMSC can be configured to deliver the key2 value to the user device via a communications channel with the user device. In various embodiments, the SMSC can deliver the key2 value to the user device via a control channel of a mobility network. It should be understood that this example embodiment is illustrative, and therefore should not be construed as being limiting in any way.

The user device can receive the key2 value via SMS (e.g., via the control channel and from the SMSC). Thus, the user device can now be in possession of the key1 value and the key2 value. It can be appreciated that the user device has obtained the key1 value via a first communications channel and from a first device (e.g., the server computer) and the key2 value via a second communications channel and from a second device (e.g., the SMSC). Thus, it can be appreciated that any device attempting to intercept the key1 value and the key2 value would be unable to do so without monitoring multiple devices and/or multiple communications channels. It should be understood that this example embodiment is illustrative, and therefore should not be construed as being limiting in any way.

At this point, it can be appreciated that the user device and the key gateway can both be in possession of the key1 value and the key2 value, though the key gateway and the user device have never exchanged either the key1 value or the key2 value with one another. According to various embodiments of the concepts and technologies disclosed herein, each of the user device and the key gateway can be configured to perform an operation on the key1 value and the key2 value to generate a respective and/or reciprocal copy of a pre-shared key. According to various embodiments of the concepts and technologies disclosed herein, the user device and the key gateway can perform an XOR operation on the key1 value and the key2 value to generate the copies of the pre-shared key. It should be understood that this example embodiment is illustrative, and therefore should not be construed as being limiting in any way.

The key gateway can be configured to provide the pre-shared key to a device that will use the pre-shared key to communicate with the user device. In some embodiments of the concepts and technologies disclosed herein, the key gateway can provide the pre-shared key to the VPN gateway, and the VPN gateway and the user device can use the respective copies of the pre-shared key to exchange encrypted communications. Thus, it can be appreciated that the user device and the VPN gateway can each possess the pre-shared key without sharing the pre-shared key with one another and/or without sharing the components used to generate the pre-shared key. Security of the operating environment therefore can be enhanced over technologies that share copies of the pre-shared key with one another. It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving, from a user device, a client identifier and a first key identifier. The client identifier can identify the user device, and the first key identifier can identify a first key including a first key value. The first key value can include a first quantumly generated random bit string. The operations further can include requesting, from a key service, the first key value via a first key request that can include the first key identifier and the client identifier; in response to receiving, from the key service, the first key value, requesting, from the key service, a second key that can include a second key value; and receiving, from the key service, the second key value and a second key identifier that identifies the second key. The second key value can include a second quantumly generated random bit string. The operations further can include providing, to a short message service center, the second key value with instructions to deliver the second key value to the user device; performing an operation on the first key value and the second key value to obtain a copy of a pre-shared key; and providing, to a device, the copy of the pre-shared key to use in exchanging encrypted communications with the user device.

In some embodiments, performing the operation on the first key value and the second key value includes performing an XOR operation on the first key value and the second key value. In some embodiments, the key service provides, to the user device, the first key value. The user device can receive the second key value via a control channel of a mobility network. The user device can generate a further copy of the pre-shared key by performing a further operation on the first key value and the second key value. In some instances, the further operation can include an XOR operation. The user device can exchange the encrypted communications with the device using the further copy of the pre-shared key.

In some embodiments, the user device and the device can exchange the encrypted communications without sharing the pre-shared key with one another. In some embodiments, providing the second key value with the instructions to the short message service center can include providing the second key value with a phone number associated with the user device. In some embodiments, providing the second key value with the instructions to the short message service center can include providing the second key value with an international mobile equipment identity associated with the user device. In some embodiments, the device can include a virtual private network gateway that can communicate with a virtual private network client of the user device via a secure communications channel.

According to another aspect of the concepts and technologies disclosed herein, a method is disclosed. The method can include receiving, at a server computer that can include a processor and from a user device, a client identifier and a first key identifier. The client identifier can identify the user device and the first key identifier can identify a first key. The first key can include a first key value that can include a first quantumly generated random bit string. The method further can include requesting, by the processor and from a key service, the first key value via a first key request that can include the first key identifier and the client identifier; in response to receiving, from the key service, the first key value, requesting, by the processor and from the key service, a second key that can include a second key value; and receiving, by the server computer and from the key service, the second key value and a second key identifier that can identify the second key. The second key value can include a second quantumly generated random bit string. The method further can include providing, by the processor and to a short message service center, the second key value with instructions to deliver the second key value to the user device; performing, by the processor, an operation on the first key value and the second key value to obtain a copy of a pre-shared key; and providing, by the processor and to a device, the copy of the pre-shared key for use in exchanging encrypted communications with the user device.

In some embodiments, performing the operation on the first key value and the second key value includes performing an XOR operation on the first key value and the second key value. In some embodiments, the key service provides, to the user device, the first key value. The user device can receive the second key value via a control channel of a mobility network. The user device can generate a further copy of the pre-shared key by performing a further operation on the first key value and the second key value. In some instances, the further operation can include an XOR operation. The user device can exchange the encrypted communications with the device using the further copy of the pre-shared key.

In some embodiments, the user device and the device can exchange the encrypted communications without sharing the pre-shared key with one another. In some embodiments, providing the second key value with the instructions to the short message service center can include providing the second key value with a phone number associated with the user device. In some embodiments, providing the second key value with the instructions to the short message service center can include providing the second key value with an international mobile equipment identity associated with the user device. In some embodiments, the device can include a virtual private network gateway that can communicate with a virtual private network client of the user device via a secure communications channel.

According to yet another aspect of the concepts and technologies disclosed herein, a computer storage medium is disclosed. The computer storage medium can store computer-executable instructions that, when executed by a processor, cause the processor to perform operations. The operations can include receiving, from a user device, a client identifier and a first key identifier. The client identifier can identify the user device, and the first key identifier can identify a first key including a first key value. The first key value can include a first quantumly generated random bit string. The operations further can include requesting, from a key service, the first key value via a first key request that can include the first key identifier and the client identifier; in response to receiving, from the key service, the first key value, requesting, from the key service, a second key that can include a second key value; and receiving, from the key service, the second key value and a second key identifier that identifies the second key. The second key value can include a second quantumly generated random bit string. The operations further can include providing, to a short message service center, the second key value with instructions to deliver the second key value to the user device; performing an operation on the first key value and the second key value to obtain a copy of a pre-shared key; and providing, to a device, the copy of the pre-shared key to use in exchanging encrypted communications with the user device.

In some embodiments, performing the operation on the first key value and the second key value includes performing an XOR operation on the first key value and the second key value. In some embodiments, the key service provides, to the user device, the first key value. The user device can receive the second key value via a control channel of a mobility network. The user device can generate a further copy of the pre-shared key by performing a further operation on the first key value and the second key value. In some instances, the further operation can include an XOR operation. The user device can exchange the encrypted communications with the device using the further copy of the pre-shared key.

In some embodiments, the user device and the device can exchange the encrypted communications without sharing the pre-shared key with one another. In some embodiments, providing the second key value with the instructions to the short message service center can include providing the second key value with a phone number associated with the user device. In some embodiments, providing the second key value with the instructions to the short message service center can include providing the second key value with an international mobile equipment identity associated with the user device. In some embodiments, the device can include a virtual private network gateway that can communicate with a virtual private network client of the user device via a secure communications channel.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
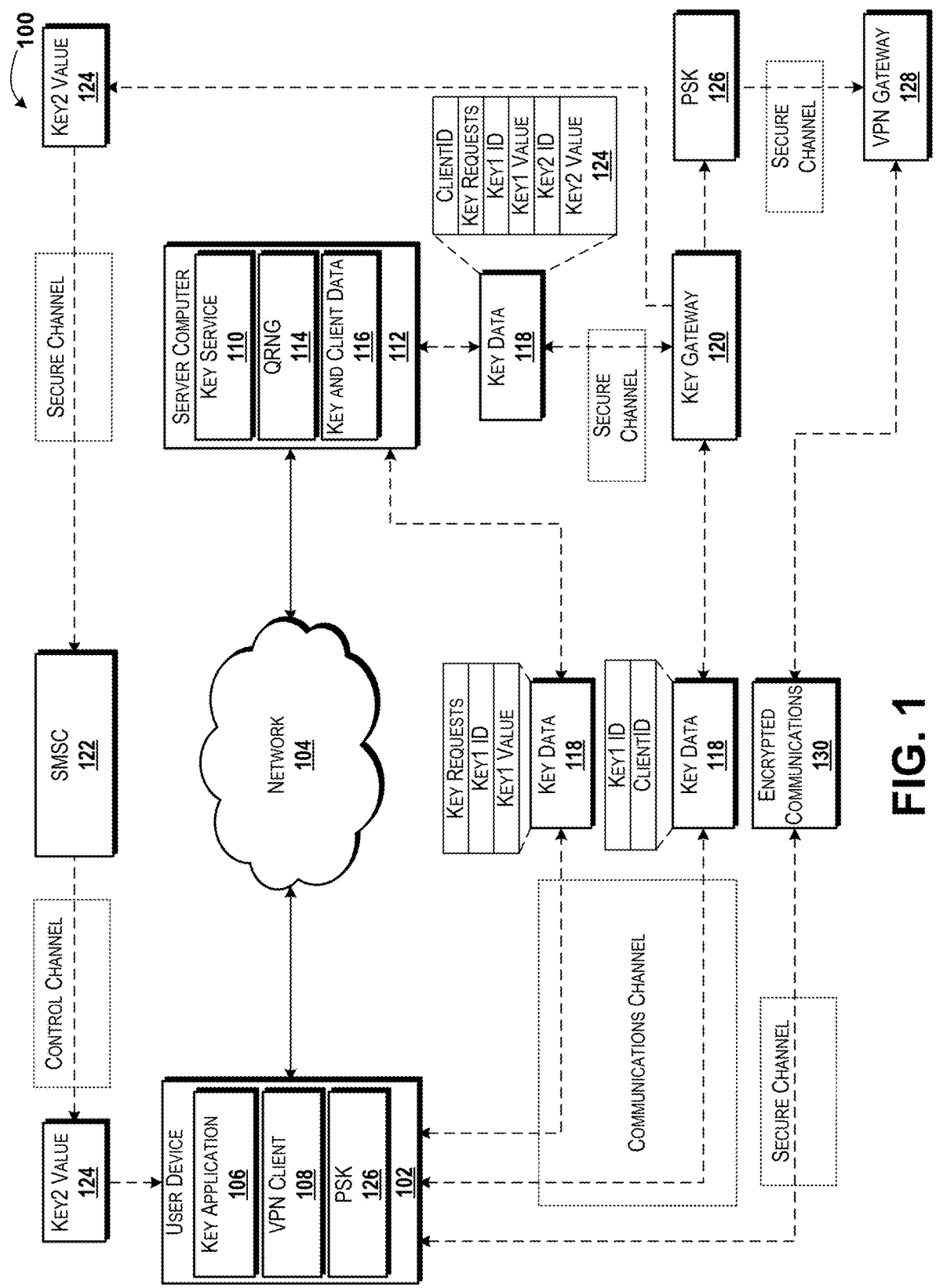
FIG. 1 is a system diagram illustrating an illustrative operating environment for various embodiments of the concepts and technologies described herein.

The following detailed description is directed to out-of-band quantum key distribution using cellular SMS. A user device can execute a key application to request key components and to generate a key for use in encrypted communications (e.g., a pre-shared key that is not shared between devices and instead is generated by the devices involved in the encrypted communications). The user device can communicate with a key service to request creation of a first key, first key portion, or first key component ("key1"). The key service can generate the value of the first key ("key1 value") by using and/or by accessing a quantum random number generator that can quantumly generate a random bit string as the key1 value. The key service can be configured to create and/or associate a first key identifier ("key1 ID") with the key1 value, and to provide the key1 value to the user device. It can be appreciated that the key1 ID and the key1 value can be included as part of the key data exchanged between the user device and the key gateway or the server computer or other device that can host the key service. The key service also can be configured to store the key1 value with the key1 ID as part of the key and client data or other data structure, which can be stored at the server computer and/or at a data storage location or device that can be accessible to the server computer in some embodiments. It should be understood that this example embodiment is illustrative, and therefore should not be construed as being limiting in any way.

The user device can be configured (e.g., via execution of the key application) to communicate with a key gateway to trigger creation of a second key, second key portion, or second key component ("key2"). In particular, the user device can send, to the key gateway, the key1 ID and a client identifier ("clientID") such as a device identifier, a subscriber identifier, or the like. The key gateway can be configured to request the key1 value from the key service in response to receiving the key1 ID and the clientID from the user device. In requesting the key1 value from the key service, the key gateway can reference the clientID, which can be used by the key service to lookup the key1 value (e.g., in the key and client data), and the key service can provide the key1 value to the key gateway. It can be appreciated that the key1 ID and the clientID can be included as part of the key data exchanged between the user device and the key gateway and between the key gateway and the server computer or other device that can host the key service. It should be understood that this example embodiment is illustrative, and therefore should not be construed as being limiting in any way.

The key gateway also can be configured to request a second key, second key portion, or second key component ("key2") from the key service in response to receiving the key1 ID and the key1 value from the key service. It can be appreciated that the request for the second key ("key2 request") can be included as part of the key data exchanged between the key gateway and the server computer or other device that can host the key service. In response to receiving the key2 request, the key service can generate the key2 value by using and/or by accessing the quantum random number generator. Again, the quantum random number generator can be configured to quantumly generate a second random bit string as the key2 value. The key service can be configured to create and/or associate a second key identifier ("key2 ID") with the key2 value, and to provide the key2 value to the key gateway. It should be noted that the key service can be configured not to directly provide the key2 value to the user device in various embodiments. It should be understood that this example embodiment is illustrative, and therefore should not be construed as being limiting in any way.

The key gateway can be configured to receive the key2 ID and the key2 value from the key service. Thus, it can be appreciated that the key gateway can be in possession of the key1 value and the key2 value. Furthermore, in response to receiving the key2 ID and key2 value, the key gateway can be configured to send the key2 value to the SMSC with instructions to send the key2 value to the user device. Thus, it can be appreciated that the key gateway can be configured to send the key2 value to the SMSC with the clientID and/or other data that can identify the user device (e.g., a phone number or the like). The SMSC can be configured to deliver the key2 value to the user device via a communications channel with the user device. In various embodiments, the SMSC can deliver the key2 value to the user device via a control channel of a mobility network. It should be understood that this example embodiment is illustrative, and therefore should not be construed as being limiting in any way.

The user device can receive the key2 value via SMS (e.g., via the control channel and from the SMSC). Thus, the user device can now be in possession of the key1 value and the key2 value. It can be appreciated that the user device has obtained the key1 value via a first communications channel and from a first device (e.g., the server computer) and the key2 value via a second communications channel and from a second device (e.g., the SMSC). Thus, it can be appreciated that any device attempting to intercept the key1 value and the key2 value would be unable to do so without monitoring multiple devices and/or multiple communications channels. It should be understood that this example embodiment is illustrative, and therefore should not be construed as being limiting in any way.

At this point, it can be appreciated that the user device and the key gateway can both be in possession of the key1 value and the key2 value, though the key gateway and the user device have never exchanged either the key1 value or the key2 value with one another. According to various embodiments of the concepts and technologies disclosed herein, each of the user device and the key gateway can be configured to perform an operation on the key1 value and the key2 value to generate a respective and/or reciprocal copy of a pre-shared key. According to various embodiments of the concepts and technologies disclosed herein, the user device and the key gateway can perform an XOR operation on the key1 value and the key2 value to generate the copies of the pre-shared key. It should be understood that this example embodiment is illustrative, and therefore should not be construed as being limiting in any way.

The key gateway can be configured to provide the pre-shared key to a device that will use the pre-shared key to communicate with the user device. In some embodiments of the concepts and technologies disclosed herein, the key gateway can provide the pre-shared key to the VPN gateway, and the VPN gateway and the user device can use the respective copies of the pre-shared key to exchange encrypted communications. Thus, it can be appreciated that the user device and the VPN gateway can each possess the pre-shared key without sharing the pre-shared key with one another and/or without sharing the components used to generate the pre-shared key. Security of the operating environment therefore can be enhanced over technologies that share copies of the pre-shared key with one another. It should be understood that this example embodiment is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for out-of-band quantum key distribution using cellular SMS will be described, according to an illustrative embodiment. The operating environment 100 shown in FIG. 1 includes a user device 102. The user device 102 can operate in communication with and/or as part of a communications network ("network") 104, though this is not necessarily the case in all embodiments.

According to various embodiments of the concepts and technologies disclosed herein, the functionality of the user device 102 may be provided by one or more server computers, desktop computers, mobile telephones, smartphones, laptop computers, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system (not labeled in FIG. 1) and one or more application programs such as, for example, a key application 106 and a VPN client 108. The operating system can include a computer program that can control the operation of the user device 102. The key application 106 and the VPN client 108 can include executable programs that can be configured to execute on top of the operating system to provide various functions as illustrated and described herein. The functionality of the key application 106 and the VPN client 108 will be illustrated and described in more detail below after introducing the other devices and/or entities shown in FIG. 1.

The operating environment 100 also can include a key service 110, which can be hosted and/or executed by a computing device such as a server computer 112. The functionality of the key service 110 will be illustrated and described in more detail herein after introducing other elements of the operating environment 100. According to various embodiments of the concepts and technologies disclosed herein, the functionality of the server computer 112 may be provided by one or more server computers, application servers, web servers, other computing systems, and the like. It should be understood that the functionality of the server computer 112 may be provided by a single device, by two or more similar devices, and/or by two or more dissimilar devices. For purposes of describing the concepts and technologies disclosed herein, the server computer 112 is described herein as an application server. It should be understood that this embodiment is illustrative, and should not be construed as being limiting in any way.

The server computer 112 (or another server or other computing device) also can be configured to host and/or execute a quantum random number generator 114 (labeled "QRNG 114" in FIG. 1). The quantum random number generator 114 can be configured to generate (quantumly) random bit strings on request of the key service 110. It therefore can be understood that the key service 110 and the quantum random number generator 114 can be hosted and/or executed by one or more devices (the same and/or different devices). As such, while the key service 110 and the quantum random number generator 114 are illustrated as being hosted and/or executed by the server computer 112, it should be understood that each of these elements, or combinations thereof, may be embodied as or in stand-alone devices or components thereof operating as part of or in communication with the network 104 and/or the server computer 112. As such, the illustrated embodiment should be understood as being illustrative of only some contemplated embodiments and should not be construed as being limiting in any way.

As shown in FIG. 1, the server computer 112 also can be configured to generate, store, and/or otherwise access key and client data 116. The key and client data 116 can include a reference table and/or other data structure for associating key identifiers ("keyIDs"), user and/or device identifiers ("clientIDs"), key values, gateway identifiers ("gatewayIDs"), and/or the like. The key and client data 116 can be used by the key service 110 as will be explained in more detail herein. It should be understood that this example embodiment is illustrative, and therefore should not be construed as being limiting in any way.

The server computer 112 also can be configured (e.g., via executing the key service 110) to receive, generate, exchange, and/or send key data 118 from, to, and/or with the user device 102 and/or a key gateway 120. As shown in FIG. 1, the key data 118 can include one or more client identifier ("clientID"), one or more key requests, one or more first key identifier ("key1 ID"), one or more first key value ("key1 value"), one or more second key identifier ("key2 ID"), one or more second key value ("key2 value"), and/or other data. These and other aspects of the key data 118, and the functionality of the key gateway 120, will be illustrated and described in more detail herein after introducing additional components of the operating environment 100.

The key gateway 120 can be configured to communicate with the user device 102 and/or a short message service center (hereinafter and labeled in FIG. 1 as "SMSC") 122 of a cellular and/or mobility network. In particular, as will be explained in more detail below, the server computer 112 can be configured to provide the key data 118 to the key gateway 120, and the key gateway 120 can be configured to forward portions of the key data 118 to the SMSC 122 for delivery to the user device 102. The user device 102 can use the key data 118 received from the server computer 112, the key gateway 120, and/or the SMSC 122 to generate and/or update a pre-shared key 126 (labeled "PSK 126" in FIG. 1), and to communicate with a VPN gateway 128 using the pre-shared key 126. According to various embodiments of the concepts and technologies disclosed herein, the VPN gateway 128 can receive the pre-shared key 126 (or an update to the pre-shared key 126 previously stored) from the key gateway 120, as will be illustrated and described herein. Thus, it can be appreciated that the user device 102 and the VPN gateway 128 can conduct encrypted communications 130 using reciprocal copies of the pre-shared key 126, without sharing copies of the pre-shared key 126 and by generating the reciprocal copies of the pre-shared key 126 at the respective devices (e.g., the user device 102 generating one copy of the pre-shared key 126 and the VPN gateway 128 using a second copy of the pre-shared key 126 that was generated at the key gateway 120 and/or elsewhere as illustrated and described herein). It should be understood that this example embodiment is illustrative, and therefore should not be construed as being limiting in any way.

Returning now to the functionality of the key application 106, various embodiments of the key application 106 illustrated and described herein can be configured to orchestrate and/or control the requesting and use of various key components such as a first key, a first key portion, and/or a first key component ("key1") and a second key, a second key portion, and/or a second key component ("key2"). The key application 106 can be configured to request a key from the key service 110. According to various embodiments of the concepts and technologies disclosed herein, the key application 106 can determine that a key should be requested in response to determining that secure communications have been requested at the user device 102 (e.g., via a VPN client 108 or the like). Because the key application 106 can determine that a key should be requested for additional and/or alternative reasons, it should be understood that the above example is illustrative and should not be construed as being limiting in any way.

As will be explained in more detail herein, the user device 102 can be configured to obtain two keys or key values that can be operated on by the key application 106 to generate the pre-shared key 126 that will be used for the encrypted communications 130. The key gateway 120 can also be configured to generate the pre-shared key 126 based on the key values, which the key gateway 120 can obtain directly from the key service 110 as will be explained in more detail below. It should be understood that this example embodiment is illustrative, and therefore should not be construed as being limiting in any way.

According to various embodiments, the key application 106 can be configured to request a first key or key portion ("key1") from the key service 110. The request for the first key ("key1 request") can be included as part of the key data 118 that can be exchanged between the user device 102, the server computer 112, and/or the key gateway 120. According to various embodiments of the concepts and technologies disclosed herein, the user device 102 can be configured to communicate with the server computer 112 via a communications channel that can be secured or non-secured in various embodiments. It should be understood that this example embodiment is illustrative, and therefore should not be construed as being limiting in any way.

In response to receiving the key1 request, the key service 110 can be configured to generate, using and/or accessing the quantum random number generator 114, a quantumly generated random bit string that can be used as the value of the first key ("key1 value"). According to various embodiments, the key service 110 can be configured to send the key1 value to the user device 102 with a key identifier for the first key (hereinafter and in the drawings referred to as "key1 ID"). The key1 value and the key1 ID can be provided by the server computer 112 to the user device 102 as part of the key data 118 illustrated in FIG. 1. It should be understood that this example embodiment is illustrative, and therefore should not be construed as being limiting in any way.

The key service 110 also can be configured to receive, from the key gateway 120, a request for the key1 value. In some embodiments, the key gateway 120 can request the key1 value by way of a service call or query, which can include the clientID and the key1 ID, with this request being invoked by the key gateway 120 in response to receiving the key1 ID and clientID from the user device 102 in some embodiments. According to various embodiments of the concepts and technologies disclosed herein, the clientID can correspond to any identifier that can be used to identify the user device 102. In some embodiments, for example, the clientID can correspond to a string of characters such as, for example, a globally unique identifier ("GUID"), an international mobile equipment identity ("IMEI"), an international mobile subscriber identity ("IMSI"), a username, an email address, an IP address, a telephone number, a media access control ("MAC") address, other identifiers and/or strings, combinations thereof, or the like.

It can be appreciated that the user device 102 can be configured to provide the clientID and the key1 ID to the key gateway 120 as part of the preparation for conducting the encrypted communications 130 and/or at other times. In response to receiving the request for the key1 value from the key gateway 120, the key service 110 can be configured to provide the key1 value to the key gateway 120. Thus, at this point the user device 102 and the key gateway 120 can be both be in possession of the key1 value without exchanging the value with each other, thus making interception of the key1 value less likely for a device monitoring the communications channel between the user device 102 and the key gateway 120 and/or the VPN gateway 128. It should be understood that this example embodiment is illustrative, and therefore should not be construed as being limiting in any way.

The key service 110 can also be configured to receive, from the key gateway 120, a request to create a second key ("key2"). The request to create the second key can be included in the key data 118 exchanged between the server computer 112 and the key gateway 120 in various embodiments. In response to receiving the request for the second key, the key service 110 can generate, again using the quantum random number generator 114, a second quantumly generated random bit string that can be used as the value of the second key (hereinafter and in the drawings "key2 value 124"). The key service 110 can provide the key2 value 124 and a key identifier for the second key (hereinafter and in the drawings referred to as "key2 ID") to the key gateway 120. Thus, it can be appreciated that the key gateway 120 can be in possession of the key1 value and the key2 value 124 at this point in the process illustrated and described herein. It should be understood that this example embodiment is illustrative, and therefore should not be construed as being limiting in any way.

The key gateway 120 also can be configured to provide, to the user device 102 and via the SMSC 122, the key2 value 124. Thus, the key gateway 120 can be configured to forward, to the SMSC 122, the key2 value 124 with instructions to deliver the key2 value 124 to the user device 102, and the SMSC 122 can forward the key2 value 124 to the user device 102 via an SMS message. In various embodiments of the concepts and technologies disclosed herein, the communications channel between the key gateway 120 and the SMSC 122 can be a secure communications channel, thereby lessening the likelihood that the key2 value 124 can be intercepted by unauthorized entities. The SMSC 122 can be configured to send the key2 value 124 to the user device 102 via SMS (e.g., via a control channel of the mobility network). It should be understood that this example embodiment is illustrative, and therefore should not be construed as being limiting in any way.

Thus, it can be appreciated that the key2 value 124 can be provided to the user device 102 out-of-band (e.g., not via the same communications medium used to exchange the key data 118 between the user device 102 and the server computer 112 and/or key gateway 120), and that the components of the pre-shared key 126 (e.g., the key1 value and the key2 value 124) can be obtained by the user device 102 from different devices and via different communications channels. In some embodiments of the concepts and technologies disclosed herein, such an approach can be used to increase the security of the operating environment 100. It should be understood that this example embodiment is illustrative, and therefore should not be construed as being limiting in any way.

The user device 102 can be configured (e.g., via execution of the key application 106), to perform an operation on and/or using the key1 value and the key2 value 124. In some embodiments of the concepts and technologies disclosed herein, the user device 102 can perform an XOR function on the key1 value and the key2 value 124 and thereby generate a pre-shared key 126 (that is formed by the operation performed on the key1 value and the key2 value 124). It should be understood that additional and/or alternative operations can be performed on the key1 value and the key2 value 124 by the key application 106 and/or other entities such as the key gateway 120. Other contemplated operations performed on the key1 value and the key2 value can include, for example, hash operations, logical manipulations of various types, combinations of operations, and/or the like. As such, the use of an XOR operation in this disclosure is illustrative and therefore should not be construed as being limiting in any way.

Similarly, the key gateway 120 can be configured to perform an operation on and/or using the key1 value and the key2 value 124. In some embodiments of the concepts and technologies disclosed herein, the key gateway 120 can perform an XOR function on the key1 value and the key2 value 124 and thereby generate a reciprocal copy of the pre-shared key 126 that was generated by the user device 102. As such, it can be appreciated that the user device 102 and the key gateway 120 can possess reciprocal copies of the pre-shared key 126 without exchanging copies of the pre-shared key 126. As such, embodiments of the concepts and technologies disclosed herein can enhance the security of exchanging pre-shared keys 126. It should be understood that this example embodiment is illustrative, and therefore should not be construed as being limiting in any way.

The key gateway 120 can be configured to provide its copy of the pre-shared key 126 to an entity that the user device 102 wishes to communicate with such as, for example, a VPN gateway 128. Thus, the VPN client 108 of the user device 102 can be in possession of and can use a first copy of the pre-shared key 126, and the VPN gateway 128 can be in possession of and can use a second copy of the pre-shared key 126. Thus, the user device 102 can exchange encrypted communications 130 with the VPN gateway 128, where the user device 102 was never provided with the pre-shared key 126 and instead generated the pre-shared key 126 and where the VPN gateway 128 was never provided with the pre-shared key 126 by the user device 102 and instead generated the pre-shared key 126 or obtained the pre-shared key 126 from the key gateway 120 (with the key gateway 120 generating the pre-shared key 126). It should be understood that this example embodiment is illustrative, and therefore should not be construed as being limiting in any way.

In practice, a user device 102 can (e.g., via execution of a key application 106) communicate with a key service 110 to request creation of a first key. The key service 110 can generate the first key using and/or by accessing a quantum random number generator 114 that can quantumly generate a random bit string as the key1 value. The key service 110 can be configured to create and/or associate a first key identifier ("key1 ID") with the first key value, and to provide the key1 value to the user device 102. It can be appreciated that the key1 ID and the key1 value can be included as part of the key data 118 exchanged between the user device 102 and the key gateway 120 or the server computer 112 or other device that can host the key service 110. It should be understood that this example embodiment is illustrative, and therefore should not be construed as being limiting in any way. The key service 110 also can be configured to store the key1 value with the key1 ID as part of the key and client data 116, which can be stored at the server computer 112 and/or at a data storage location or device that can be accessible to the server computer 112. It should be understood that this example embodiment is illustrative, and therefore should not be construed as being limiting in any way.

The user device 102 can be configured (e.g., via execution of the key application 106) to communicate with a key gateway 120 to trigger creation of a second key or key portion ("key2"). In particular, the user device 102 can send, to the key gateway 120, the key1 ID and a client identifier ("clientID") such as a device identifier, a subscriber identifier, or the like. The key gateway 120 can be configured to request the key1 value from the key service 110 in response to receiving the key1 ID and the clientID from the user device 102. In requesting the key1 value from the key service 110, the key gateway 120 can reference the clientID, which can be used by the key service 110 to lookup the key1 value (e.g., in the key and client data 116), and the key service 110 can provide the key1 value to the key gateway 120. It can be appreciated that the key1 ID and the clientID can be included as part of the key data 118 exchanged between the user device 102 and the key gateway 120 and between the key gateway 120 and the server computer 112 or other device that can host the key service 110. It should be understood that this example embodiment is illustrative, and therefore should not be construed as being limiting in any way.

The key gateway 120 also can be configured to request a second key ("key2") from the key service 110 in response to receiving the key1 ID and the key1 value from the key service 110. It can be appreciated that the request for the second key ("key2 request") can be included as part of the key data 118 exchanged between the key gateway 120 and the server computer 112 or other device that can host the key service 110. It should be understood that this example embodiment is illustrative, and therefore should not be construed as being limiting in any way.

In response to receiving the key2 request, the key service 110 can generate the second key using and/or by accessing the quantum random number generator 114. Again, the quantum random number generator 114 can be configured to quantumly generate a second random bit string as the key2 value 124. The key service 110 can be configured to create and/or associate a second key identifier ("key2 ID") with the second key value, and to provide the key2 value 124 to the key gateway 120. It should be noted that the key service 110 can be configured not to provide the key2 value 124 to the user device 102 in various embodiments. It should be understood that this example embodiment is illustrative, and therefore should not be construed as being limiting in any way.

The key gateway 120 can be configured to receive the key2 ID and the key2 value 124 from the key service 110. Thus, it can be appreciated that the key gateway 120 can be in possession of the key1 value and the key2 value 124. Furthermore, in response to receiving the key2 ID and key2 value 124, the key gateway 120 can be configured to send the key2 value 124 to the SMSC 122 with instructions to send the key2 value 124 to the user device 102. Thus, it can be appreciated that the key gateway 120 can be configured to send the key2 value 124 to the SMSC 122 with the clientID and/or other data that can identify the user device 102 (e.g., a phone number or the like). The SMSC 122 can be configured to deliver the key2 value 124 to the user device 102 via a communications channel with the user device 102. In various embodiments, the SMSC 122 can deliver the key2 value 124 to the user device 102 via a control channel of a mobility network. It should be understood that this example embodiment is illustrative, and therefore should not be construed as being limiting in any way.

The user device 102 can receive the key2 value 124 via SMS (e.g., via the control channel and from the SMSC 122). Thus, the user device 102 can now be in possession of the key1 value and the key2 value 124. It can be appreciated that the user device 102 has obtained the key1 value via a first communications channel and from a first device (e.g., the server computer 112) and the key2 value 124 via a second communications channel and from a second device (e.g., the SMSC 122). Thus, it can be appreciated that any device attempting to intercept the key1 value and the key2 value 124 would be unable to do so without monitoring multiple devices and/or multiple communications channels. It should be understood that this example embodiment is illustrative, and therefore should not be construed as being limiting in any way.

At this point, it can be appreciated that the user device 102 and the key gateway 120 can both be in possession of the key1 value and the key2 value 124, though the key gateway 120 and the user device 102 have never exchanged either the key1 value or the key2 value 124 with one another. According to various embodiments of the concepts and technologies disclosed herein, each of the user device 102 and the key gateway 120 can be configured to perform an operation on the key1 value and the key2 value 124 to generate a respective and/or reciprocal copy of a pre-shared key 126. According to various embodiments of the concepts and technologies disclosed herein, the user device 102 and the key gateway 120 can perform an XOR operation on the key1 value and the key2 value 124 to generate the copies of the pre-shared key 126. It should be understood that this example embodiment is illustrative, and therefore should not be construed as being limiting in any way.

The key gateway 120 can be configured to provide the pre-shared key 126 to a device that will use the pre-shared key 126 to communicate with the user device 102. In some embodiments of the concepts and technologies disclosed herein, the key gateway 120 can provide the pre-shared key 126 to the VPN gateway 128, and the VPN gateway 128 and the user device 102 can use the respective copies of the pre-shared key 126 to exchange encrypted communications 130. Thus, it can be appreciated that the user device 102 and the VPN gateway 128 can each possess the pre-shared key 126 without sharing the pre-shared key 126 with one another and/or without sharing the components used to generate the pre-shared key 126. Security of the operating environment 100 therefore can be enhanced over technologies that share copies of the pre-shared key 126 with one another. It should be understood that this example embodiment is illustrative, and therefore should not be construed as being limiting in any way.

FIG. 1 illustrates one user device 102, one network 104, one server computer 112, one key gateway 120, one SMSC 122, and one VPN gateway 128. It should be understood, however, that various implementations of the operating environment 100 can include one or more than one user device 102; one or more than one network 104; one or more than one server computer 112; one or more than one key gateway 120; one or more than one SMSC 122; and/or zero, one, or more than one VPN gateway 128. As such, the illustrated embodiment should be understood as being illustrative, and should not be construed as being limiting in any way.

Figure 2:
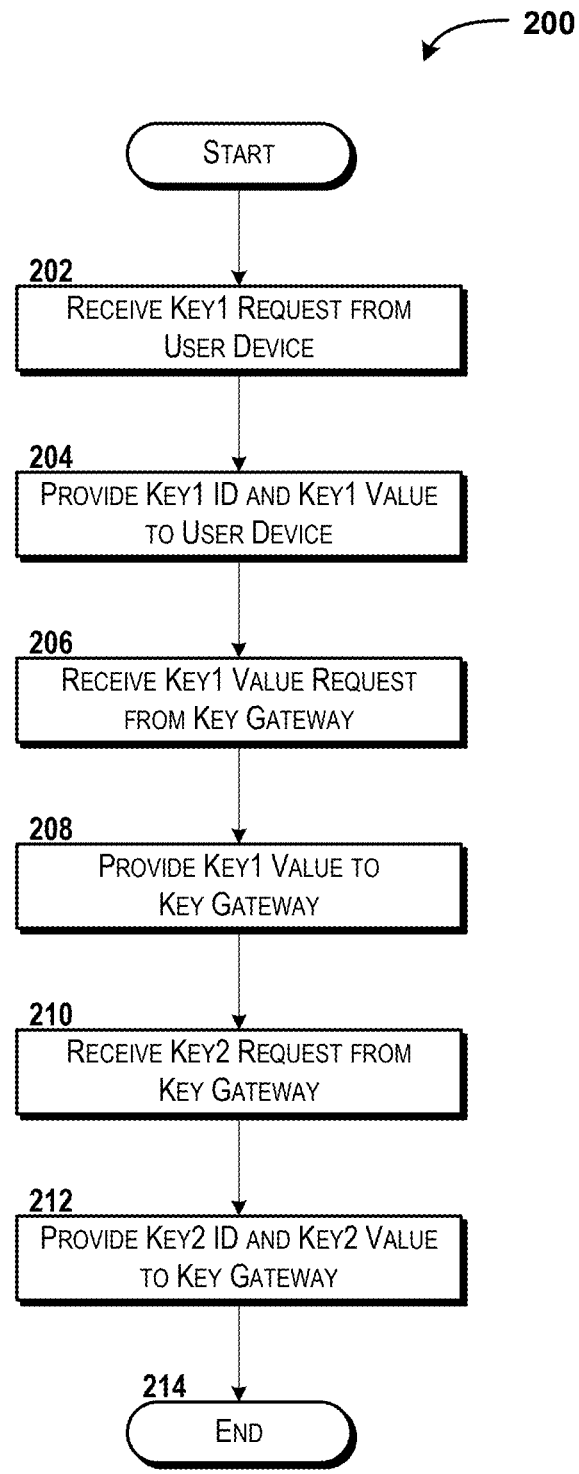
FIG. 2 is a flow diagram showing aspects of a method for providing out-of-band quantum key distribution using cellular SMS, according to an illustrative embodiment of the concepts and technologies described herein.

Turning now to FIG. 2, aspects of a method 200 for providing out-of-band quantum key distribution using cellular SMS will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, the server computer 112, and/or the key gateway 120, to perform one or more operations and/or causing the processor to direct other components of the computing system or device to perform one or more of the operations.

For purposes of illustrating and describing the concepts of the present disclosure, the method 200 is described herein as being performed by the server computer 112 via execution of one or more software modules such as, for example, the key service 110. It should be understood that additional and/or alternative devices and/or network nodes can provide the functionality described herein via execution of one or more modules, applications, and/or other software including, but not limited to, the key service 110. Thus, the illustrated embodiments are illustrative, and should not be viewed as being limiting in any way.

The method 200 begins at operation 202. At operation 202, the server computer 112 can receive a request for a first key ("a key1 request") from a device such as the user device 102. As explained herein, the key1 request can request a first key (or a portion of a key) from the key service 110. The first key or first key portion ("key1") can include a bit string such as a randomly generated bit string, which can be generated in various embodiments of the concepts and technologies disclosed herein by a quantum random number generator 114. The key1 request can be included as part of the key data 118, which can be provided to the server computer 112 directly by the user device 102, and/or can be received from the key gateway 120 in various embodiments. As such, it can be appreciated that the server computer 112 can receive the key1 request from the user device 102 or from the key gateway 120. It should be understood that these example embodiments are illustrative, and therefore should not be construed as being limiting in any way.

From operation 202, the method 200 can proceed to operation 204. At operation 204, the server computer 112 can provide the first key identifier ("key1 ID") and the first key value ("key1 value") to the user device 102. As explained herein, the key1 ID can include any identifier that can be used to identify the key1 value, and the key1 value can include a randomly generated bit string that can be created by the quantum random number generator 114 as illustrated and described herein. As such, it can be appreciated that the key1 ID can be stored with the key1 value by the server computer 112 and/or in other data storage entities for later retrieval by keying on and/or referencing the key1 ID. According to various embodiments of the concepts and technologies disclosed herein, the key1 ID and the key1 value can be stored as part of the key and client data 116. It should be understood that this example embodiment is illustrative, and therefore should not be construed as being limiting in any way.

From operation 204, the method 200 can proceed to operation 206. At operation 206, the server computer 112 can receive a request for the value of the first key ("key1 value request") from the key gateway 120. It can be appreciated that the key gateway 120 may request the key1 value (e.g., the actual bit string that functions as the value of the first key) for later use in generating the pre-shared key 126. In any event, the key1 value request can be included as part of the key data 118, which as noted above can be shared between the server computer 112 and the key gateway 120, e.g., via a secure connection. It should be understood that this example embodiment is illustrative, and therefore should not be construed as being limiting in any way.

From operation 206, the method 200 can proceed to operation 208. At operation 208, the server computer 112 can provide the key1 value to the key gateway 120. As illustrated and described above with reference to FIG. 1, the key1 value can be provided by the server computer 112 to the key gateway 120 as part of the key data 118, which as noted above can be shared between the server computer 112 and the key gateway 120, e.g., via a secure connection. It should be understood that this example embodiment is illustrative, and therefore should not be construed as being limiting in any way.

From operation 208, the method 200 can proceed to operation 210. At operation 210, the server computer 112 can receive a request for a second key ("key2 request") from the key gateway 120. The key2 request can request a second key (or a second portion of a key) from the key service 110. The second key or second key portion ("key2") can include a bit string such as a randomly generated bit string, which also can be generated in various embodiments of the concepts and technologies disclosed herein by the quantum random number generator 114. The key2 request can be included as part of the key data 118, which can be provided to the server computer 112 by the key gateway 120 in various embodiments. As such, it can be appreciated that the server computer 112 can receive the key2 request from the key gateway 120 in operation 210. It should be understood that this example embodiment is illustrative, and therefore should not be construed as being limiting in any way.

From operation 210, the method 200 can proceed to operation 212. At operation 212, the server computer 112 can provide a second key identifier ("key2 ID") and the value of the second key or second key portion ("key2 value 124") to the key gateway 120. It can be appreciated that as a result, the key gateway 120 can be in possession of the key1 value and the key2 value 124, which can be provided to the key gateway 120 via a secure connection. Meanwhile, the key2 value 124 may not be provided directly to the user device 102 by the server computer 112 as part of the method 200 illustrated and described herein. As such, it can be appreciated that the key2 value 124 may be protected from disclosure to any entity that is able to monitor communications between the user device 102 and the server computer 112. As explained herein, the key2 value 124 can be provided to the user device 102 via other communication channels than those used to communicate the key1 value and the key1 ID to the user device 102. It should be understood that this example embodiment is illustrative, and therefore should not be construed as being limiting in any way.

From operation 212, the method 200 can proceed to operation 214. The method 200 can end at operation 214.

Figure 3:
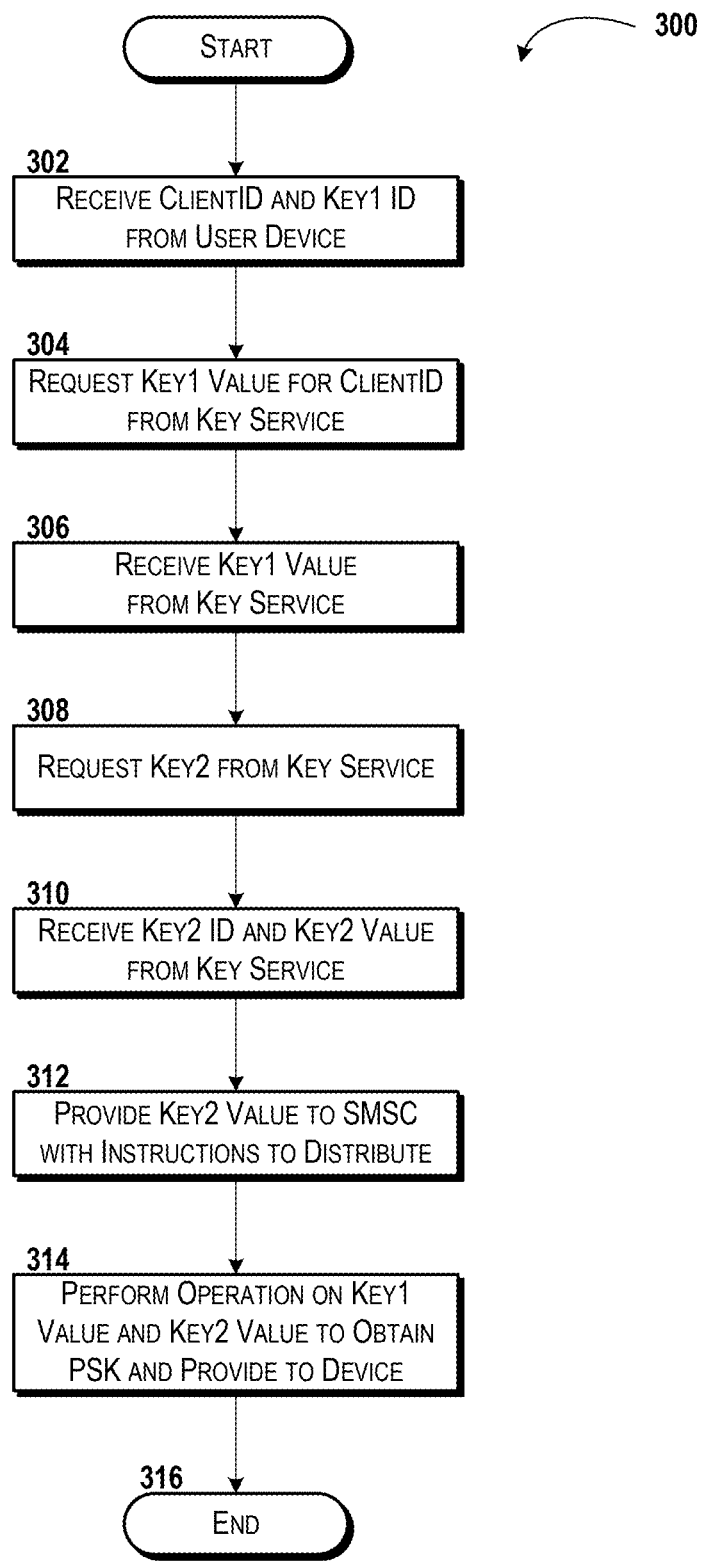
FIG. 3 is a flow diagram showing additional aspects of a method for providing out-of-band quantum key distribution using cellular SMS, according to an illustrative embodiment of the concepts and technologies described herein.

Turning now to FIG. 3, aspects of a method 300 for providing out-of-band quantum key distribution using cellular SMS will be described in detail, according to an illustrative embodiment. For purposes of illustrating and describing the concepts of the present disclosure, the method 300 is described herein as being performed by the key gateway 120 via execution of one or more software modules such as, for example, the key gateway application. It should be understood that additional and/or alternative devices and/or network nodes can provide the functionality described herein via execution of one or more modules, applications, and/or other software including, but not limited to, the key gateway application. Thus, the illustrated embodiments are illustrative, and should not be viewed as being limiting in any way.

The method 300 begins at operation 302. At operation 302, the key gateway 120 can receive a client identifier ("clientID") and a key1 ID from the user device 102. As explained above, the clientID can correspond to any identifier that can be used to identify the user device 102 such as, for example, a GUID, an IMEI, an IMSI, a username, an email address, an IP address, a telephone number, a MAC address, other identifiers and/or strings, combinations thereof, or the like. The clientID can be used to associate a keyID with a particular device (e.g., the user device 102) and can be stored, e.g., with the key1 ID, the key1 value, the key2 ID, the key2 value 124, and/or other data as part of the key and client data 116. Thus, the key gateway 120 can be configured to receive the clientID and the key1 ID from the user device 102, and to use this information to retrieve one or more of the key1 value, the key2 ID, and/or the key2 value 124. It should be understood that this example embodiment is illustrative, and therefore should not be construed as being limiting in any way.

From operation 302, the method 300 can proceed to operation 304. At operation 304, the key gateway 120 can request the value of the first key ("key1 value") for the clientID from the key service 110. Thus, in operation 304 the key gateway 120 can generate a key1 value request (using the clientID as identifying information) and provide the key1 value request to the server computer 112. The key1 value request can be included as part of the key data 118, which can be provided to the server computer 112 by the key gateway 120 in various embodiments. It should be understood that this example embodiment is illustrative, and therefore should not be construed as being limiting in any way.

From operation 304, the method 300 can proceed to operation 306. At operation 306, the key gateway 120 can receive the value of the first key ("key1 value") from the key service 110. Thus, in operation 306, the key gateway 120 can receive the bit string or the like, which can correspond to the actual value of the first key. In various embodiments of the concepts and technologies disclosed herein, the key1 value can be received from the server computer 112 as part of the key data 118, which can be provided to the key gateway 120 via a secure connection with the server computer 112 in various embodiments. It should be understood that this example embodiment is illustrative, and therefore should not be construed as being limiting in any way.

From operation 306, the method 300 can proceed to operation 308. At operation 308, the key gateway 120 can request a second key ("key2") from the key service 110. In various embodiments of the concepts and technologies disclosed herein, the request for key2 ("key2 request") can be provided by the key gateway 120 to the server computer 112 as part of the key data 118, which can be provided by the key gateway 120 to the server computer 112 via a secure connection with the server computer 112 in various embodiments. It should be understood that this example embodiment is illustrative, and therefore should not be construed as being limiting in any way.

From operation 308, the method 300 can proceed to operation 310. At operation 310, the key gateway 120 can receive a key2 ID and a key2 value 124 from the key service 110. As explained herein, the key2 ID can include any identifier that can be used to identify the key2 value 124, and the key2 value 124 can include a randomly generated bit string that can be created by the quantum random number generator 114 as illustrated and described herein. As such, it can be appreciated that the key2 ID can be stored with the key2 value 124 by the server computer 112 and/or in other data storage entities for later retrieval by keying on and/or referencing the key2 ID. For example, according to various embodiments of the concepts and technologies disclosed herein, the key2 ID and the key2 value 124 can be stored as part of the key and client data 116. At any rate, in operation 310, the key gateway 120 can receive the key2 ID and the key2 value 124 from the server computer 112. In various embodiments of the concepts and technologies disclosed herein, the key2 ID and the key2 value 124 can be received by the key gateway 120 from the server computer 112 as part of the key data 118, which as noted above can be provided to the key gateway 120 via a secure connection with the server computer 112 in various embodiments. It should be understood that this example embodiment is illustrative, and therefore should not be construed as being limiting in any way.

It can be appreciated that as a result of operation 310, the key gateway 120 can be in possession of the key1 value and the key2 value 124 (in addition to the key1 ID and the key2 ID), all of which can be provided to the key gateway 120 via a secure connection with the server computer 112. The user device 102, meanwhile, may as of this point in the flow of the method 300, be in possession of only the key1 value and key1 ID. As explained herein, the key2 value 124 can be provided to the user device 102 via other communication channels than those used to communicate the key1 value and the key1 ID to the user device 102 to avoid disclosure of the multiple components of the pre-shared key 126 via a single communication channel. It should be understood that this example embodiment is illustrative, and therefore should not be construed as being limiting in any way.

From operation 310, the method 300 can proceed to operation 312. At operation 312, the key gateway 120 can provide the key2 value 124 to the SMSC 122 with instructions to distribute the key2 value 124 to the user device 102. In various embodiments of the concepts and technologies disclosed herein, the key gateway 120 can provide the key2 value 124 to the SMSC 122 with the clientID, which can be interpreted and/or understood by the SMSC 122 to correspond to an instruction to deliver the key2 value 124 to the user device 102 via SMS. As such, it can be appreciated that the user device 102 may receive the key1 value via a first communication channel (e.g., between the user device 102 and the server computer 112 or the key gateway 120) and the key2 value 124 via a control channel of a mobility network or other portion of the network 104. It should be understood that this example embodiment is illustrative, and therefore should not be construed as being limiting in any way.

From operation 312, the method 300 can proceed to operation 314. At operation 314, the key gateway 120 can perform an operation on the key1 value and the key2 value 124 to obtain a pre-shared key 126. In some embodiments of the concepts and technologies disclosed herein, the key gateway 120 can perform an XOR operation on the key1 value and the key2 value 124 to obtain the pre-shared key 126. It should be understood that other operations can be performed on the key1 value and key2 value 124 by the key gateway 120 to generate the pre-shared key 126. Thus, it can be appreciated that the key gateway 120 can generate the pre-shared key 126 using the key components (e.g., the key1 value and the key2 value 124) as illustrated and described herein. Similarly, the key gateway 120 will be able to exchange encrypted communications 130 with other devices (e.g., the user device 102) using the pre-shared key 126 without actually sharing the pre-shared key 126 with the other devices (e.g., the user device 102) in various embodiments of the concepts and technologies disclosed herein. The key gateway 120 also can provide the pre-shared key 126 to a device (e.g., the VPN gateway 128) in some embodiments. The VPN gateway 128 or other device can use the pre-shared key 126 for encrypted communications. It should be understood that this example embodiment is illustrative, and therefore should not be construed as being limiting in any way.

Although not shown in FIG. 3, it can be appreciated that the user device 102 and/or other devices (e.g., the VPN gateway 128) can exchange encrypted communications 130. Furthermore, it can be appreciated that the user device 102 and the other device (e.g., the VPN gateway 128) can exchange the encrypted communications 130 using reciprocal copies of the pre-shared key 126 generated at and/or by the respective devices. Thus, it can be appreciated that in various embodiments of the concepts and technologies disclosed herein, the pre-shared key 126 may not be directly shared by the user device 102 and/or any other device that uses the pre-shared key 126 (e.g., the VPN gateway 128) to exchange the encrypted communications 130. Thus, security of the pre-shared key 126 can be ensured by the embodiments of the concepts and technologies disclosed herein. It should be understood that this example embodiment is illustrative, and therefore should not be construed as being limiting in any way.

From operation 314, the method 300 can proceed to operation 316. The method 300 can end at operation 316.

Figure 4:
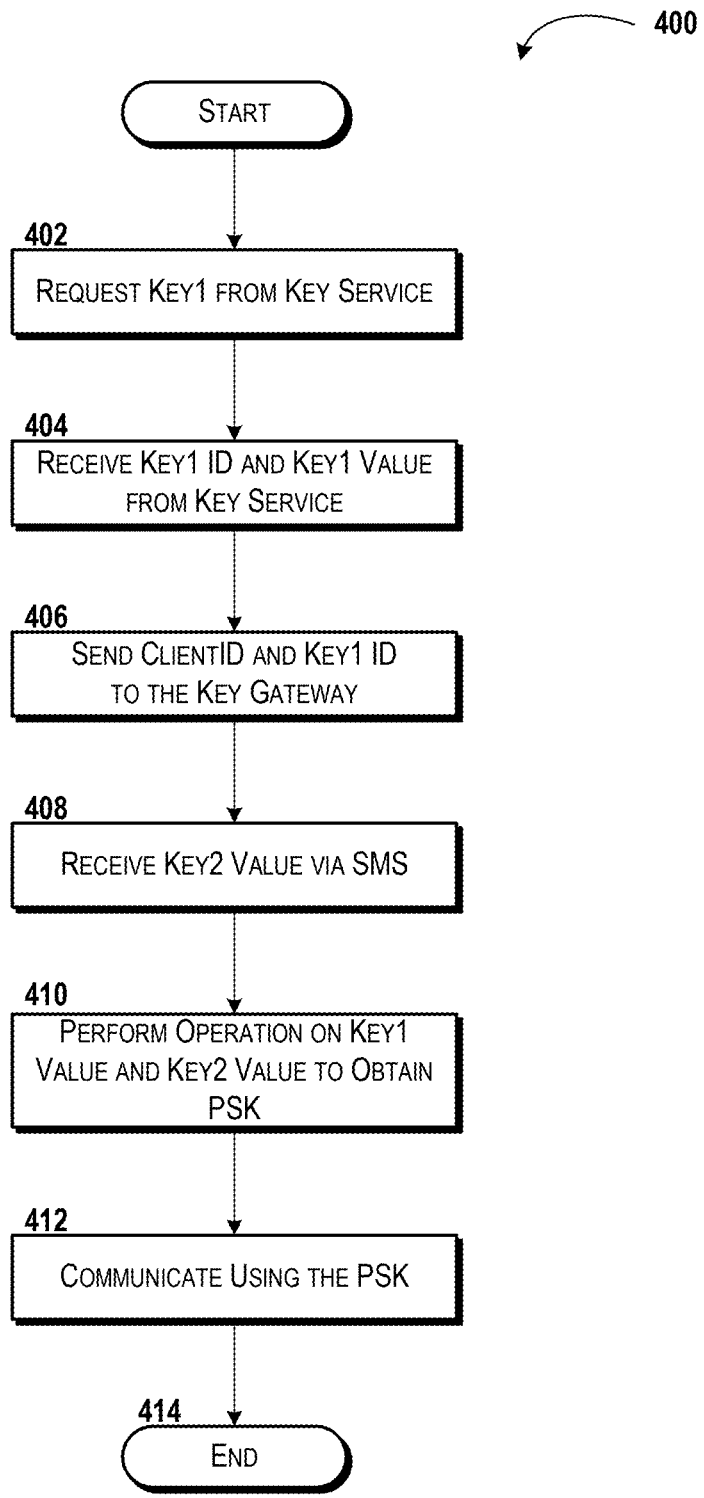
FIG. 4 is a flow diagram showing additional aspects of a method for providing out-of-band quantum key distribution using cellular SMS, according to an illustrative embodiment of the concepts and technologies described herein.

Turning now to FIG. 4, aspects of a method 400 for providing out-of-band quantum key distribution using cellular SMS will be described in detail, according to an illustrative embodiment. For purposes of illustrating and describing the concepts of the present disclosure, the method 400 is described herein as being performed by the user device 102 via execution of one or more software modules such as, for example, the key application 106 and/or a VPN client 108. It should be understood that additional and/or alternative devices and/or network nodes can provide the functionality described herein via execution of one or more modules, applications, and/or other software including, but not limited to, the key application 106 and/or a VPN client 108. Thus, the illustrated embodiments are illustrative, and should not be viewed as being limiting in any way.

The method 400 begins at operation 402. At operation 402, the user device 102 can send a request for a first key ("key1 request") to the key service 110. Although not shown in FIG. 4, it should be understood that the user device 102 can first authenticate with the key service 110 and/or the server computer 112 in various embodiments, and therefore the key1 request may be sent by the user device 102 to the server computer 112 via a secured communications channel. It should be understood that this example embodiment is illustrative, and therefore should not be construed as being limiting in any way.

As explained herein, the key1 request can request a first key (or a portion of a key) from the key service 110 and can be sent by the user device 102 to the server computer 112 or other device that can host and/or execute the key service 110. According to various embodiments of the concepts and technologies disclosed herein, the key1 request can be included by the user device 102 as part of the key data 118, which can be provided to the server computer 112 directly by the user device 102. In some other embodiments, the user device 102 can be configured to send the key1 request to the key gateway 120. In any event, in some embodiments the key1 request can be sent by the user device 102 to the server computer 112 via a secured communication channel with the server computer 112 and/or the key gateway 120, or via non-secured communication channels in some embodiments. In the embodiment illustrated in FIG. 4, the user device 102 can provide the key1 request to the server computer 112 as part of the key data 118. It should be understood that this example embodiment is illustrative, and therefore should not be construed as being limiting in any way.

From operation 402, the method 400 can proceed to operation 404. At operation 404, the user device 102 can receive the key1 ID and the key1 value from the key service 110 (e.g., the server computer 112 that hosts and/or executes the key service 110). As explained herein, the key1 ID can include any identifier that can be used to identify the key1 value, and the key1 value can include a randomly generated bit string that can be created by the quantum random number generator 114 (e.g., hosted and/or executed by the server computer 112 and/or accessible to the key service 110) as illustrated and described herein. As such, it can be appreciated that the key1 ID can be stored and/or associated with the key1 value by the user device 102 for use in later requesting and/or retrieving the key1 value. It should be understood that this example embodiment is illustrative, and therefore should not be construed as being limiting in any way.

From operation 404, the method 400 can proceed to operation 406. At operation 406, the user device 102 can send the clientID and the key1 ID to the key gateway 120. As explained above with reference to FIG. 3, the key gateway 120 may send the key1 ID and the clientID to the key service 110, and in response to the request, the key service 110 may provide, to the key gateway 120, the key1 value for the user device 102 or another device identified by the clientID. Thus, the key gateway 120 can be provided with the key1 value without requesting creation of the first key in various embodiments of the concepts and technologies disclosed herein. It should be understood that this example embodiment is illustrative, and therefore should not be construed as being limiting in any way.

Furthermore, as explained above with reference to FIG. 3, the key gateway 120 can be configured to request creation of the second key or second key portion ("key2") in response to receiving the key1 ID and the key1 value from the key service 110. Thus, it can be appreciated that the user device 102 may request creation of the first key or first key portion ("key1") and that the key gateway 120 may request creation of the second key or second key portion ("key2"). Thus, it can be appreciated that two different entities may request creation of the key components (e.g., key1 and key2) using two different communication channels (e.g., a secure or non-secure connection between the user device 102 and the server computer 112 and/or the key gateway 120 for key1, and a secure connection between the key gateway 120 and the server computer 112 for key2). Because two different devices are requesting creation of the key components (e.g., key1 and key2) via two different communication channels, intercepting the key values (e.g., the key1 value and the key2 value 124) can be difficult.

Similarly, it can be appreciated that the key values (e.g., the key1 value and the key2 value 124) can be provided to the user device 102 and the key gateway 120 via different channels (e.g., a secure or non-secure connection between the user device 102 and the server computer 112 and/or the key gateway 120 for the key1 value, a control channel of a mobility network between the user device 102 and the SMSC 122 for the key2 value 124, and a secure connection between the key gateway 120 and the server computer 112 for the key1 value and the key 2 value). Thus, it can be appreciated that the key gateway 120 and the user device 102 can both be configured to generate reciprocal copies of the pre-shared key 126 using the key1 value and the key2 value 124 without sharing these values between the key gateway 120 and the user device 102. It should be understood that this example embodiment is illustrative, and therefore should not be construed as being limiting in any way.

From operation 406, the method 400 can proceed to operation 408. At operation 408, the user device 102 can receive the key2 value 124 via an SMS message (e.g., over a control channel of a cellular connection between the user device 102 and a mobility network or other portion of the network 104). As such, it can be appreciated that the user device 102 can obtain the key1 value via a first communications channel between the user device 102 and one of the key gateway 120 or the server computer 112, while the user device 102 can obtain the key2 value 124 via a second communications channel between the user device 102 and the SMSC 122. It should be understood that this example embodiment is illustrative, and therefore should not be construed as being limiting in any way.

From operation 408, the method 400 can proceed to operation 410. At operation 410, the user device 102 can perform an operation on the key1 value and the key2 value 124 to obtain a pre-shared key 126. In some embodiments of the concepts and technologies disclosed herein, the user device 102 can perform an XOR operation on the key1 value and the key2 value 124 to obtain the pre-shared key 126. It should be understood that other operations can be performed on the key1 value and key2 value 124 by the user device 102 to generate the pre-shared key 126. Thus, it can be appreciated that the user device 102 can generate the pre-shared key 126 using the key components (e.g., the key1 value and the key2 value 124) as illustrated and described herein. Similarly, the user device 102 will be able to conduct encrypted communications with other devices using the pre-shared key 126 without actually sharing the pre-shared key 126 with the other devices in various embodiments of the concepts and technologies disclosed herein. It should be understood that this example embodiment is illustrative, and therefore should not be construed as being limiting in any way.

From operation 410, the method 400 can proceed to operation 412. At operation 412, the user device 102 can communicate using the pre-shared key obtained in operation 410. According to various embodiments of the concepts and technologies disclosed herein, operation 412 can correspond to the user device 102 exchanging encrypted communications 130 with another device (e.g., the VPN gateway 128) with the user device 102 and the other device (e.g., the VPN gateway 128) using reciprocal copies of the pre-shared key 126 generated at the respective devices. Thus, it can be appreciated that the pre-shared key 126 may never be shared by the user device 102 and/or other device that uses the pre-shared key 126 (e.g., the VPN gateway 128) in various embodiments of the concepts and technologies disclosed herein. It should be understood that this example embodiment is illustrative, and therefore should not be construed as being limiting in any way.

From operation 412, the method 400 can proceed to operation 414. The method 400 can end at operation 414.

Figure 5:
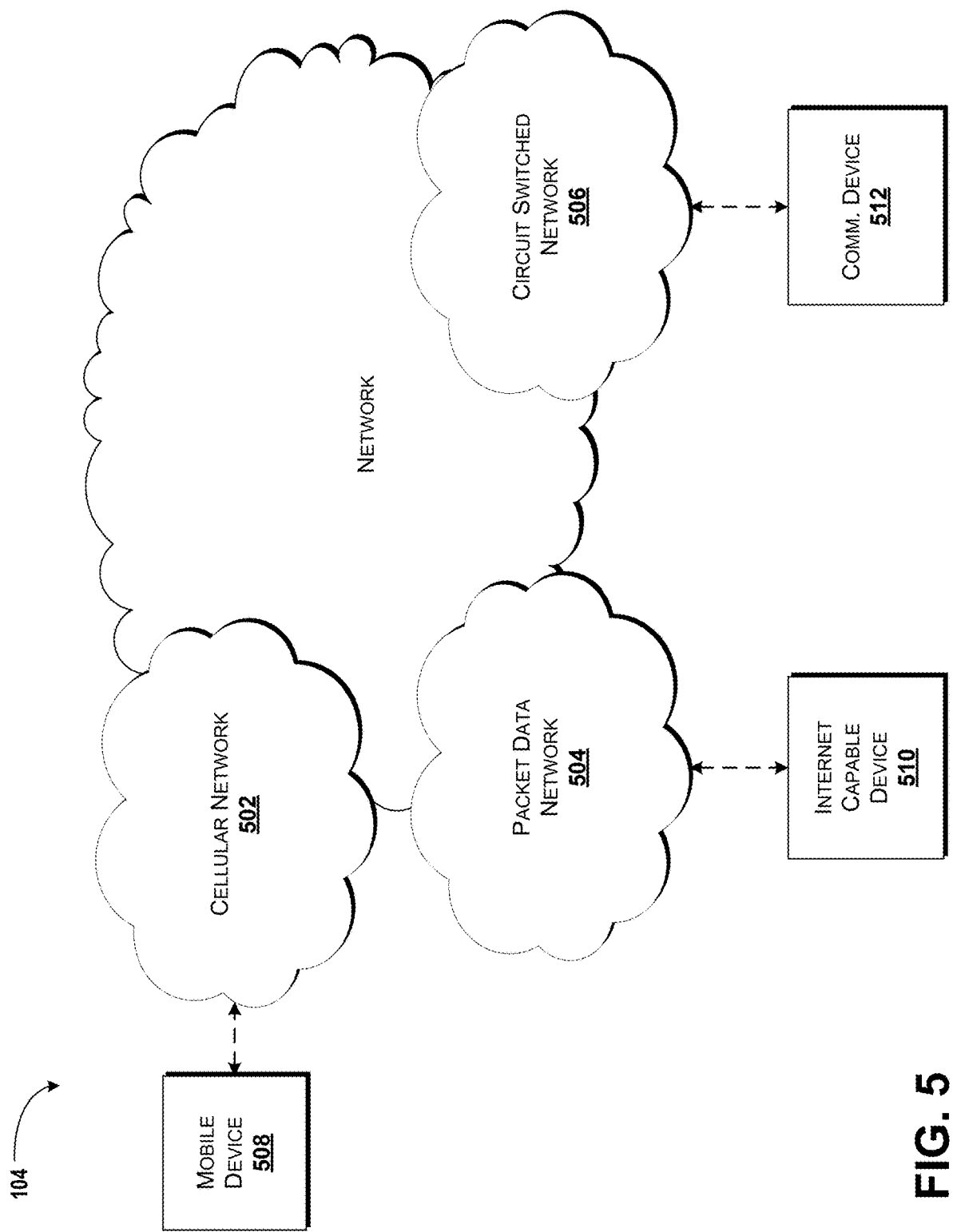
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs); mobile management entities ("MMEs"); access and mobility management functions ("AMFs); authentication server functions ("AUSFs"), network slice selection functions ("NSSFs); network exposure functions ("NEFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 502 also can include various interfaces between various components, as is generally understood. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards, 5G mobile communications standards, 6G mobile communication standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
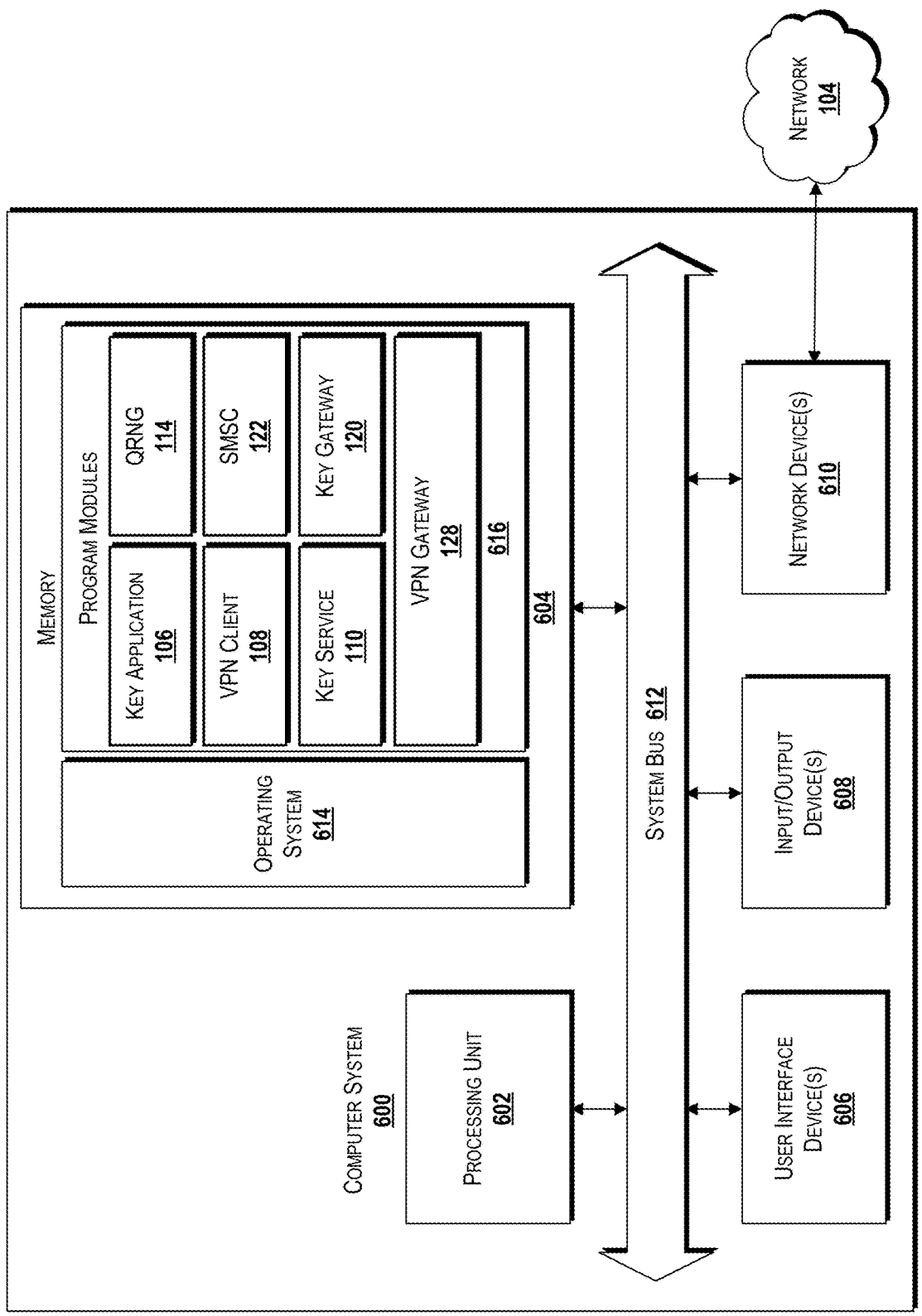
FIG. 6 is a block diagram illustrating an example computer system configured to provide out-of-band quantum key distribution using cellular SMS, according to some illustrative embodiments of the concepts and technologies described herein.

FIG. 6 is a block diagram illustrating a computer system 600 configured to provide the functionality described herein for providing out-of-band quantum key distribution using cellular SMS, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The system bus 612 can enable bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the key application 106, the VPN client 108, the key service 110, and/or the quantum random number generator 114. These and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, and 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the key and client data 116, the key data 118 (e.g., including the clientID, the key1 request, the key1 ID, the key1 value, the key2 request, the key2 ID, and the key2 value 124), the pre-shared key 126, the encrypted communications 130, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
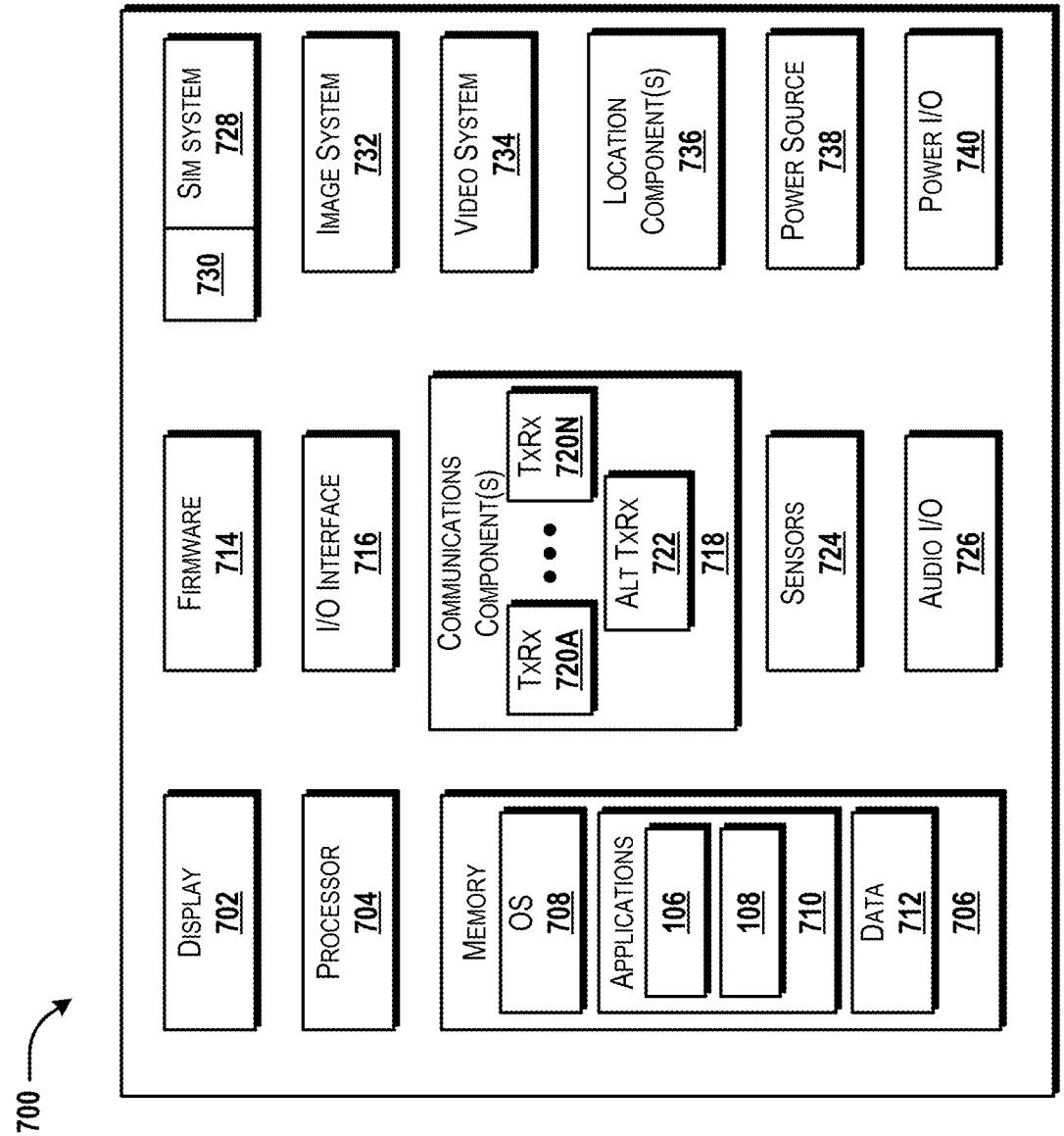
FIG. 7 is a block diagram illustrating an example mobile device configured to obtain an out-of-band quantum key via cellular SMS, according to some illustrative embodiments of the concepts and technologies described herein.

Turning now to FIG. 7, an illustrative mobile device 700 and components thereof will be described. In some embodiments, the user device 102 described above with reference to FIGS. 1-4 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the key application 106 and/or the VPN client 108, other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, configuring settings, manipulating address book content and/or settings, multi-mode interaction, interacting with other applications 710, and otherwise facilitating user interaction with the operating system 708, the applications 710, and/or other types or instances of data 712 that can be stored at the mobile device 700. The data 712 can include, for example, the key and client data 116, the key data 118 (e.g., including the clientID, the key1 request, the key1 ID, the key1 value, the key2 request, the key2 ID, and the key2 value 124), the pre-shared key 126, the encrypted communications 130, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, authentication information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, 6G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an N<sup>th</sup> transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system ("image system") 732. The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
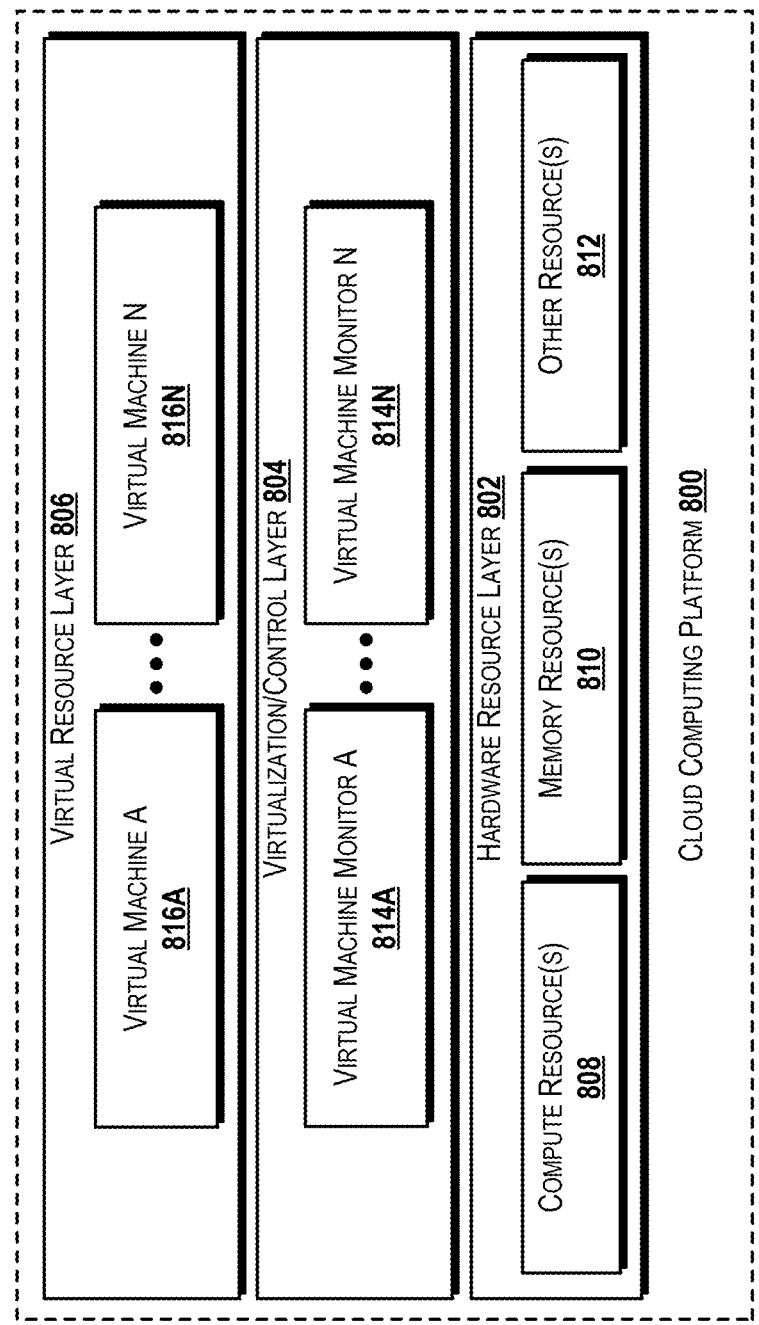
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for providing out-of-band quantum key distribution using cellular SMS and/or for interacting with the key application 106, the VPN client 108, the key service 110, and/or the quantum random number generator 114. Thus, it can be appreciated that in some embodiments of the concepts and technologies disclosed herein, the cloud computing platform 800 illustrated in FIG. 8 can be used to provide the functionality described herein with respect to the user device 102, the server computer 112, the key gateway 120, the SMSC 122, and/or the VPN gateway 128.

The cloud computing platform 800 thus may be utilized to execute any aspects of the software components presented herein. Thus, according to various embodiments of the concepts and technologies disclosed herein, the key application 106, the VPN client 108, the key service 110, and/or the quantum random number generator 114 can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the key application 106, the VPN client 108, the key service 110, and/or the quantum random number generator 114 illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that an SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAP-DRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, California, and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the key application 106, the VPN client 108, the key service 110, and/or the quantum random number generator 114 or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the key and client data 116, the key data 118 (e.g., including the clientID, the key1 request, the key1 ID, the key1 value, the key2 request, the key2 ID, and the key2 value 124), the pre-shared key 126, the encrypted communications 130, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for providing out-of-band quantum key distribution using cellular SMS have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      receiving, from a user device, a client identifier and a first key identifier, wherein the client identifier identifies the user device, and wherein the first key identifier identifies a first key comprising a first key value comprising a first quantumly generated random bit string,
      requesting, from a key service, the first key value via a first key request comprising the first key identifier and the client identifier,
      in response to receiving, from the key service, the first key value, requesting, from the key service, a second key comprising a second key value,
      receiving, from the key service, the second key value and a second key identifier that identifies the second key, wherein the second key value comprises a second quantumly generated random bit string,
      providing, to a short message service center, the second key value with instructions to deliver the second key value to the user device,
      performing an operation on the first key value and the second key value to obtain a copy of a pre-shared key, and
      providing, to a device, the copy of the pre-shared key to use in exchanging encrypted communications with the user device.

2. The system of claim 1, wherein performing the operation on the first key value and the second key value comprises performing an XOR operation on the first key value and the second key value.

3. The system of claim 1, wherein the key service provides, to the user device, the first key value, and wherein the user device receives the second key value via a control channel of a mobility network, wherein the user device generates a further copy of the pre-shared key by performing a further operation on the first key value and the second key value, and wherein the user device exchanges the encrypted communications with the device using the further copy of the pre-shared key.

4. The system of claim 3, wherein the user device and the device exchange the encrypted communications without sharing the pre-shared key with one another.

5. The system of claim 4, wherein providing the second key value with the instructions to the short message service center comprises providing the second key value with a phone number associated with the user device.

6. The system of claim 4, wherein providing the second key value with the instructions to the short message service center comprises providing the second key value with an international mobile equipment identity associated with the user device.

7. The system of claim 1, wherein the device comprises a virtual private network gateway that communicates with a virtual private network client of the user device via a secure communications channel.

8. A method comprising:
   receiving, at a server computer comprising a processor and from a user device, a client identifier and a first key identifier, wherein the client identifier identifies the user device, and wherein the first key identifier identifies a first key comprising a first key value comprising a first quantumly generated random bit string;
   requesting, by the processor and from a key service, the first key value via a first key request comprising the first key identifier and the client identifier;
   in response to receiving, from the key service, the first key value, requesting, by the processor and from the key service, a second key comprising a second key value;
   receiving, by the server computer and from the key service, the second key value and a second key identifier that identifies the second key, wherein the second key value comprises a second quantumly generated random bit string;
   providing, by the processor and to a short message service center, the second key value with instructions to deliver the second key value to the user device;

performing, by the processor, an operation on the first key value and the second key value to obtain a copy of a pre-shared key; and providing, by the processor and to a device, the copy of the pre-shared key for use in exchanging encrypted communications with the user device.

9. The method of claim 8, wherein performing the operation on the first key value and the second key value comprises performing an XOR operation on the first key value and the second key value.

10. The method of claim 8, wherein the key service provides, to the user device, the first key value, wherein the user device receives the second key value via a control channel of a mobility network, wherein the user device generates a further copy of the pre-shared key by performing a further operation on the first key value and the second key value, and wherein the user device exchanges the encrypted communications with the device using the further copy of the pre-shared key.

11. The method of claim 10, wherein the user device and the device exchange the encrypted communications without sharing the pre-shared key with one another.

12. The method of claim 11, wherein providing the second key value with the instructions to the short message service center comprises providing the second key value with a phone number associated with the user device.

13. The method of claim 8, wherein the device comprises a virtual private network gateway that communicates with a virtual private network client of the user device via a secure communications channel.

14. A computer storage medium having computer-executable instructions stored thereon that, when executed by a processor, cause the processor to perform operations comprising:

receiving, from a user device, a client identifier and a first key identifier, wherein the client identifier identifies the user device, and wherein the first key identifier identifies a first key comprising a first key value comprising a first quantumly generated random bit string;

requesting, from a key service, the first key value via a first key request comprising the first key identifier and the client identifier;

in response to receiving, from the key service, the first key value, requesting, from the key service, a second key comprising a second key value;

receiving, from the key service, the second key value and a second key identifier that identifies the second key, wherein the second key value comprises a second quantumly generated random bit string;

providing, to a short message service center, the second key value with instructions to deliver the second key value to the user device;

performing an operation on the first key value and the second key value to obtain a copy of a pre-shared key; and providing, to a device, the copy of the pre-shared key to use in exchanging encrypted communications with the user device.

15. The computer storage medium of claim 14, wherein performing the operation on the first key value and the second key value comprises performing an XOR operation on the first key value and the second key value.

16. The computer storage medium of claim 14, wherein the key service provides, to the user device, the first key value, wherein the user device receives the second key value via a control channel of a mobility network, wherein the user device generates a further copy of the pre-shared key by performing a further operation on the first key value and the second key value, and wherein the user device exchanges the encrypted communications with the device using the further copy of the pre-shared key.

17. The computer storage medium of claim 16, wherein the user device and the device exchange the encrypted communications without sharing the pre-shared key with one another.

18. The computer storage medium of claim 17, wherein providing the second key value with the instructions to the short message service center comprises providing the second key value with a phone number associated with the user device.

19. The computer storage medium of claim 17, wherein providing the second key value with the instructions to the short message service center comprises providing the second key value with an international mobile equipment identity associated with the user device.

20. The computer storage medium of claim 14, wherein the device comprises a virtual private network gateway that communicates with a virtual private network client of the user device via a secure communications channel.

* * * * *